United States Patent
Ottaviani et al.

(10) Patent No.: US 7,737,211 B2
(45) Date of Patent: Jun. 15, 2010

(54) METHOD FOR FORMING NANOCOMPOSITE MATERIALS

(75) Inventors: Robert A. Ottaviani, Anthem, AZ (US); William R. Rodgers, Bloomfield Township, MI (US); Paula D. Fasulo, Eastpointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1316 days.

(21) Appl. No.: 11/220,988

(22) Filed: Sep. 7, 2005

(65) Prior Publication Data

US 2007/0055005 A1 Mar. 8, 2007

(51) Int. Cl.
*A61K 9/16* (2006.01)

(52) U.S. Cl. ........................ 524/543; 524/445

(58) Field of Classification Search ................. 524/543, 524/445
See application file for complete search history.

(56) References Cited

U.S. PATENT DOCUMENTS

| | | | |
|---|---|---|---|
| 5,955,535 | A | 9/1999 | Vaia et al. |
| 5,962,553 | A | 10/1999 | Ellsworth |
| 6,034,163 | A | 3/2000 | Barbee et al. |
| 6,057,035 | A | 5/2000 | Singh et al. |
| 6,060,549 | A | 5/2000 | Li et al. |
| 6,083,559 | A | 7/2000 | Beall et al. |
| 6,225,374 | B1 | 5/2001 | Vaia et al. |
| 2002/0120049 | A1* | 8/2002 | Van Es et al. ............ 524/445 |
| 2007/0100044 | A1* | 5/2007 | Jeon et al. .................. 524/284 |

FOREIGN PATENT DOCUMENTS

WO WO 01/48080 A1 7/2001

OTHER PUBLICATIONS

Kato, M. et al., "Synthesis of Polypropylene Oligomer-Clay Intercalation Compounds," J. Appl. Poly. Sci., 66, pp. 1781-1785 (1997).
Kurokawa, Y. et al., "Structure and properties of a montmorilionite/polypropylene nanocomposite," J. Matl. Sci. Letters, 16, pp. 1670-1672 (1997).
Lan, T. et al., "Preparation of High Performance Polypropylene Nanocomposites," presented at Additives 2000, Clearwater Beach, FL, Apr. 10-12, 2000 (14 pages).
Oya, A., et al., "Factors controlling mechanical properties of clay mineral/polypropylene nanocomposites." J. Matl. Sci., 35, pp. 1045-1050 (2000).

* cited by examiner

*Primary Examiner*—Robert D. Harlan
(74) *Attorney, Agent, or Firm*—Dierker & Associates, P.C.

(57) ABSTRACT

A method for forming a nanocomposite material includes introducing a nanofiller material having polar end groups into an extruder having a polymeric material therein. An unsaturated shielding material is introduced into the extruder. The unsaturated shielding material reacts with the polar end groups, thereby forming a shielded nanofiller material. The shielded nanofiller material is grafted to the polymeric material, thereby forming the nanocomposite material. The nanofiller material therein is substantially exfoliated, and the nanocomposite material exhibits enhanced physical properties.

20 Claims, 3 Drawing Sheets

US 7,737,211 B2

METHOD FOR FORMING NANOCOMPOSITE MATERIALS

TECHNICAL FIELD

The present disclosure relates generally to nanocomposites, and more particularly to the nanofiller materials in nanocomposites.

BACKGROUND

Nanotechnology can be defined as materials or devices engineered at the molecular level. Within this category are polymer nanocomposites, which are a class of materials that use molecular sized particles for reinforcing the polymer matrix, e.g., the reinforcing filler possesses one or more dimensions on a sub-micrometer scale. These materials blend a nanofiller with a polymer to produce a composite with equal or better physical and mechanical properties than their conventionally filled counterparts but at lower filler loadings.

Due to the surface area available with nanofillers, polymer nanocomposites offer the potential for enhanced mechanical properties, barrier properties, thermal properties, and flame retardant properties when compared to conventionally filled materials.

One class of polymer nanocomposites uses a nanofiller material that is based on the smectite class of aluminum silicate clays, a common representative of which is montmorillonite. Although naturally occurring and synthetic variations of this basic mineral structure can be used to make nanocomposites, the structure should allow the exchange of interlayer inorganic cations, such as $Na^+$ or $Ca^{2+}$, with organic cations, such as alkylammonium cations, if property enhancements are to be achieved. The silicate platelets consist of a central octahedral aluminate structure surrounded on either side with a tetrahedral silicate structure. Iron or magnesium occasionally replaces an aluminum atom, rendering an overall negative charge. This charge is counterbalanced by the inorganic cations which reside between the sheets, holding them loosely together. The exchange of interlayer inorganic cations with organic cations increases the spacing between the silicate sheets, as well as improves the compatibility of the filler and the resin system, thereby facilitating exfoliation.

When exfoliated properly, these layered silicates have size dimensions approximately 1 nm thick by about 50 to 2000 nm long. This leads to aspect ratios on the order of about 50 to 2000. This value is quite high compared to the aspect ratio of conventional fillers such as talc (aspect ratio ~1) and glass fibers (aspect ratio ~20). Due, at least in part, to this high aspect ratio, there is the potential to obtain properties equal to or greater than conventionally filled materials but at much lower filler loadings, for example, between about 2% and about 5%. Conventionally filled materials require about 20% to 30% loadings to achieve equivalent property enhancement.

For optimum reinforcement properties, not only is good exfoliation desirable, but also good distribution of the silicate layers throughout the resin, and good compatibility between the polymer resin and the filler.

Exfoliation of the nanofiller reinforces the resins which results in enhanced physical and mechanical properties. Traditional processes use external compatibilizers to make the nanofiller less polar and increase its miscibility with non-polar olefinic resins. However, one of the drawbacks of current nanocomposite materials is a potential lack of development of a high degree of exfoliation (dispersion) of the nanofiller material.

SUMMARY

The present disclosure substantially solves the drawbacks enumerated above by providing a method for forming a nanocomposite material. The method includes introducing a nanofiller material having polar end groups into an extruder having a polymeric material therein. An unsaturated shielding material is introduced into the extruder. The unsaturated shielding material reacts with the polar end groups, thereby forming a shielded nanofiller material. The shielded nanofiller material is grafted to the polymeric material, thereby forming the nanocomposite material. The nanofiller material is substantially exfoliated, and the nanocomposite material exhibits enhanced physical properties.

BRIEF DESCRIPTION OF THE DRAWINGS

Objects, features and advantages of embodiments of the present invention may become apparent upon reference to the following detailed description and drawings, in which.

DETAILED DESCRIPTION

The present disclosure is predicated upon the unexpected and fortuitous discovery that a compatibilized nanofiller material may be prepared in-situ during preparation of nanocomposite materials. The nanofiller material and an unsaturated shielding material may be directly introduced into an extruder having a molten polymeric material therein. The nanofiller material and unsaturated shielding material react to form the compatibilized nanofiller material (i.e. shielded nanofiller material) exhibiting substantially increased exfoliation. An initiator is added to promote polymerization, and the shielded nanofiller is grafted to the polymeric material. This may be advantageously cost effective in that less expensive monomeric unsaturated shielding materials rather than polymerized unsaturated materials are used. Further, the process may be advantageous in that the nanofiller compatibilization occurs in-situ and avoids use of external compatibilizer processes. It is believed, without being bound to any theory, that this increased exfoliation of the nanofiller material may advantageously enhance the physical and/or mechanical properties of the nanocomposite material.

It is to be understood that embodiment(s) of the nanocomposite material(s) may be suitable for many applications. One non-limitative example of such an application includes use as an automotive interior body material and/or an automotive exterior body material.

Figure 1:
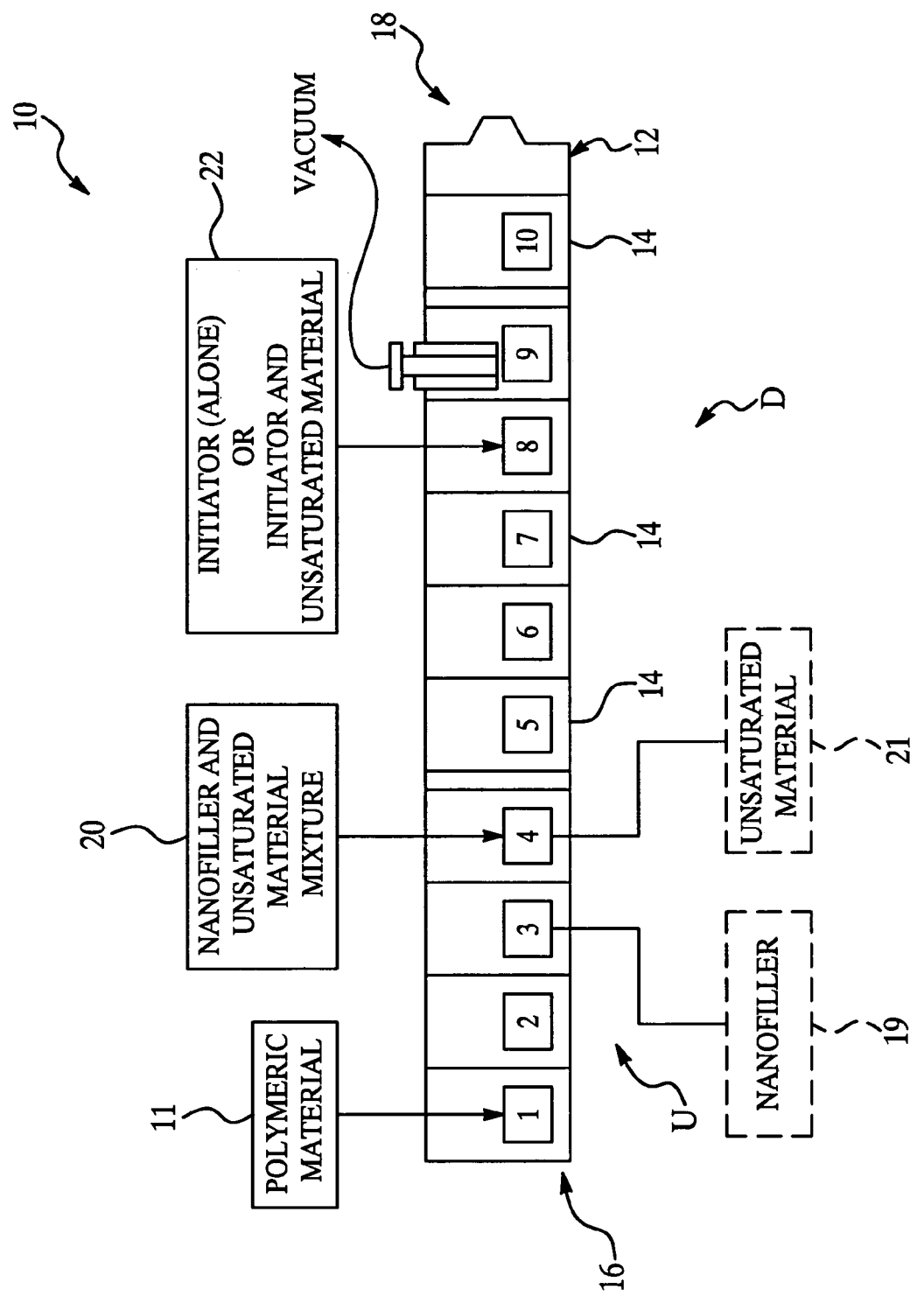
FIG. 1 is schematic diagram depicting an extruder and embodiments of the method.

Referring now to FIG. 1, a schematic representation of some of the method steps according to embodiments disclosed herein are shown. Polymeric material (also denoted generally as "resin") is introduced, shown at reference numeral 11, into an extruder 10 having an entrance 16 and an exit 18. The extruder 10 has a plurality of barrels/cylinders 14 (shown schematically) in fluid communication with a screw 12 rotating therewithin. Generally, the barrel(s) 14 adjacent the entrance 16 is/are considered upstream U, while the barrel(s) 14 adjacent the exit 18 are considered downstream D. It is to be understood that, as flow moves from the entrance 16 toward the exit 18, barrel(s) 14 may be referred to as "downstream" relative to barrel(s) 14 further upstream (similarly, barrel(s) 14 may be referred to as "upstream" relative to barrel(s) 14 further downstream).

The polymeric material/resin introduction 11 is via an upstream U barrel 14 (for example, barrel "1") in the extruder 10. The polymeric material flows downstream D during the melting and mixing process. It is to be understood that as the polymeric material/resin moves downstream D, the polymeric material becomes molten polymeric material.

It is to be understood that the polymeric material may include any suitable thermoplastic materials. In an embodiment, the thermoplastic materials include, but are not limited to, at least one of polypropylenes, polyethylenes, elastomers, impact copolymers thereof, polystyrene, polyethyleneterephthalate, polymethylmethacrylate, polycarbonate, polyurethane, poly(acrylonitrile-co-butadiene-co-styrene) (ABS), poly(acrylonitrile-co-styrene-co-acrylate) (ASA), poly(styrene-co-butadiene-co-styrene) (SBS), polycarbonate-poly(acrylonitrile-co-butadiene-co-styrene) (PC-ABS), and mixtures thereof.

In an alternate embodiment, the polymeric material is a thermoplastic olefinic (TPO) material. The TPO may be at least one of polypropylene homopolymers, impact modified polypropylene, ethylene propylene elastomers, and mixtures thereof.

Some non-limiting examples of suitable polymeric materials are shown below in Table 1 under the labels "Polypropylenes," "Propylene Copolymers" and "Elastomers."

TABLE I

| MATERIAL | SUPPLIER | GRADE |
|---|---|---|
| Polypropylenes | Basell USA, Inc.; Lansing, Michigan | Profax 6301, Profax 6323, Profax 6523, Profax PD 702, Profax PH020, Profax PH 382M |
| | Dow Chemical; Midland, Michigan | TF-1802 |
| | Equistar Chemicals LP; Houston, Texas | Petrothene PP 8001-LK, Petrothene PP 8020-AU, Petrothene PP8020-GU |
| | ExxonMobil Chemical; Houston, Texas | PP-1074KN, PP1105E1, PP-3546G, PP1044 |
| | Huntsman Polymers LLC; Marysville, Michigan | H0500NS, P4CCN-41 |
| Propylene Copolymers | Basell USA, Inc.; Lansing, Michigan | Profax 7101S, Metocene RM 1099, Profax EL245S, Profax SD-242, Profax SG-702, Profax SV-152, Hifax CA53G |
| | Dow Chemical; Midland, Michigan | C700-35N, C702-20, 705-44 NA |
| | Equistar Chemicals LP; Houston, Texas | Petrothene PP36KK01, Petrothene PP35FR03, Petrothene PP35FU01, Petrothene PP44FY01, Petrothene PP44FZ01, Petrothene PP8752HF, Petrothene PP8462HR, Petrothene PP8775HU |
| | ExxonMobil Chemical; Houston, Texas | PP-AX03BE5, PP822XE1, Mytex AN17K-01, PP7032KN, PP7033N, PP8023 |
| Elastomers | Basell USA, Inc.; Lansing, Michigan | Adflex KS021P, Adflex KS357P, Hifax CA207A, Hifax CA10GC, Hifax CA244 |
| | Dupont-Dow Elastomers LLC; Wilmington, Delaware | Engage 8100, Engage 8150, Engage 8200, Engage 8440, Engage 8540, Engage 8842, Nordel IP NDR3722P, Nordel IP NDR4820P, Nordel IP NDR3670, Nordel IP NDR4725P, Nordel IP NDR4770R |
| | Equistar Chemicals LP; Houston, Texas | Petrothene PP8312-KO, Petrothene PP43QW02 |
| | ExxonMobil Chemical; Houston, Texas | Exact 0201, Exact 0210, Exact 8201, Exact 8210, Exact 4053, Exact 4041, Exact 3035, Vistalon 404, Vistalon 707, Vistalon 785 |

In an embodiment, a nanofiller material is introduced into the extruder downstream D (as at 19, 20) of an area of the extruder 10 wherein the polymeric material has been substantially melted and mixed. An unsaturated shielding material is also introduced into the extruder 10 downstream D (as at 20, 21) of the area of the extruder 10 wherein the polymeric material has been substantially melted and mixed. In an embodiment, the nanofiller material is pretreated/mixed with a dilute solution of unsaturated material. The pretreated nanofiller material and unsaturated shielding material mixture is introduced (as at 20) to the molten polymeric material via an upstream U barrel 14 (one non-limiting example of which is barrel "4").

Figure 2:
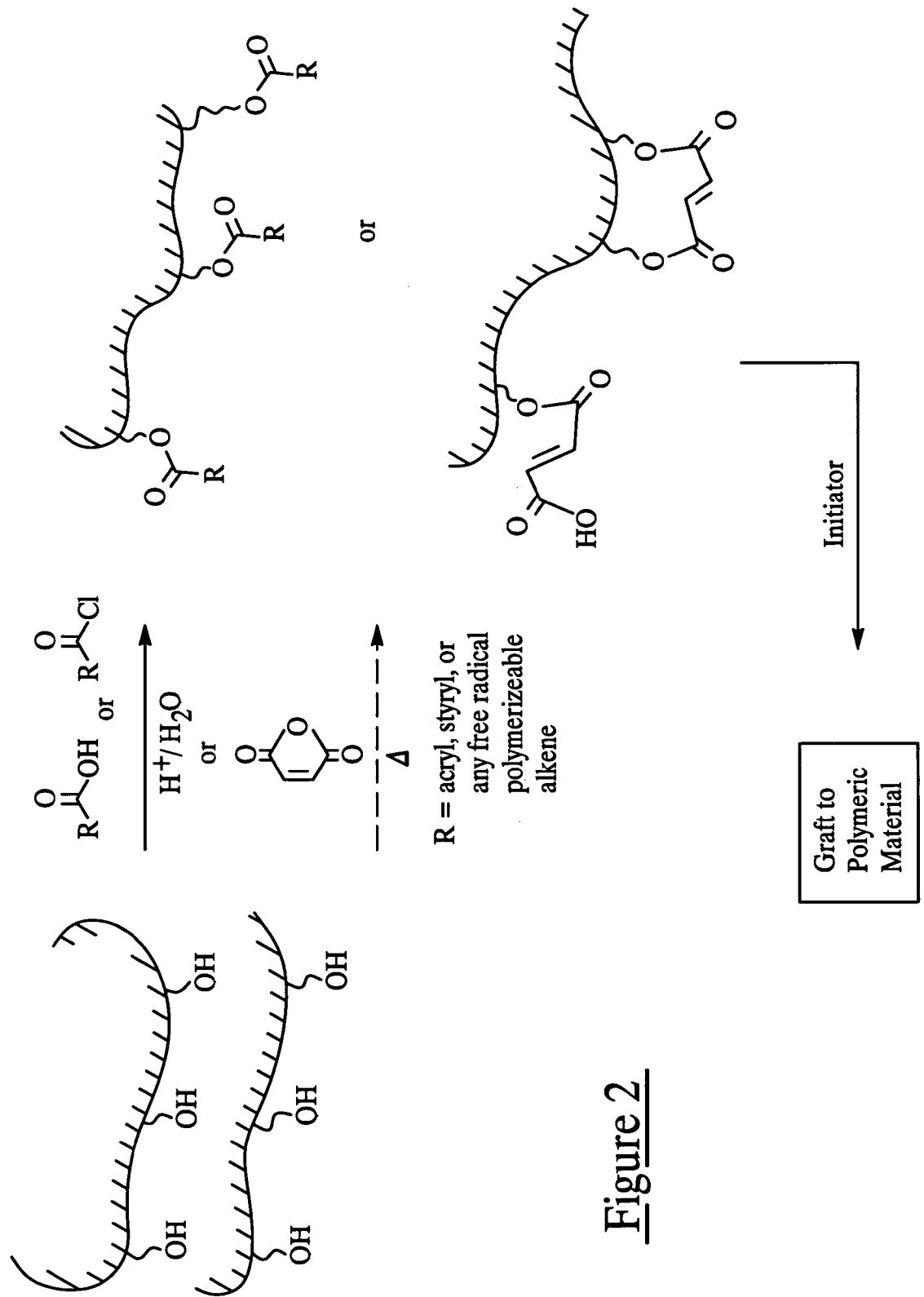
FIG. 2 is a schematic diagram illustrating some of the chemical reactions of embodiment(s) of the method.

After the introduction of the nanofiller/unsaturated material mixture, the nanofiller material chemically reacts with the unsaturated shielding material to form a shielded nanofiller material. It is to be understood that, depending upon the reactive groups on the nanofiller material and/or the unsaturated material, the reaction may take place via a variety of mechanisms. One non-limitative example of a suitable reaction mechanism is an esterification reaction (as shown in FIG. 2). The reaction of the nanofiller material/unsaturated material may be accomplished by any suitable means. In an embodiment, the barrel temperature is controlled to a suitable temperature as desired to achieve the targeted product at high yields. It is to be understood that a suitable temperature may depend upon, at least in part, the polymer selected and the specific reaction that is involved. In an embodiment where a polyolefin material is selected, the reaction temperature may range from about 170° C. to about 250° C., alternately from about 180° C. to about 230° C., and still further from about 180° C. to about 200° C.

The intermediate product formed is a compatabilized nanofiller (i.e. shielded nanofiller material) where the previously unprotected polar groups (e.g. hydroxyl groups) have become shielded (i.e. substantially non-polar).

It is to be understood that the nanofiller material may be any suitable nanofiller material. In an embodiment, the nanofiller is a clay material. Examples of suitable clay materials include, but are not limited to at least one of smectite, hectorite, montmorillonite, bentonite, beidelite, saponite, stevensite, sauconite, nontronite, illite, and mixtures thereof. It is to be understood that the clay material may be an organically modified clay material, e.g. an organoclay. In an embodiment, the nanofiller material is an aluminum silicate smectite clay. In a further embodiment, the nanofiller is organically modified montmorillonite.

Further, it is to be understood that the unsaturated shielding material may be any unsaturated material that chemically combines with the polar end groups that reside on the edges of the nanofiller material. In an embodiment, the unsaturated shielding material may be any acid chloride, carboxylic acid, or anhydride having a free radical polymerizeable alkene functional group, or mixtures thereof. In a further embodiment, the unsaturated material includes, but is not limited to, at least one of acrylic acids, styrylic acids, maleic anhydride, acrylic acid chlorides, styrylic acid chlorides, silanes having at least one unsaturated organic group, and mixtures thereof.

It is to be understood that the R group of the unsaturated material may be any suitable group. In an embodiment, R is at least one of an acryl group, styryl group, any free radical polymerizeable alkene group, and mixtures thereof.

The formation of a shielded polar group (one example of which is a shielded hydroxyl group), i.e. masking the polarity of the polar group by an organic ligand, may be accomplished via any of a number of chemical reactions.

In one embodiment, reactions of polar groups with silyl halides or silyl ethers of the general form $R_nSiX_{(4-n)}$, wherein n represents an integer from 1 to 3; R represents an alkyl group, an aryl group, an alkylaryl group, a vinyl group, an allyl group, an alkylamino group, an arylamino group, or organic moieties that may contain ketone, ester, ether, organosulfur or carboxyl groups, or combinations thereof; and wherein X represents an alkoxy group, an aryloxy group, an amino group, hydrogen, a halogen, or combinations thereof, result in shielded polar groups. The resulting shielded polar group from this reaction(s), if, for example, the nanofiller material were montmorillonite clay, would be of the general form $Mont_{(4-n)}SiR_n$, where Mont represents the edge of the montmorillonite sheet.

Other suitable shielding reactions are reactions of polar groups with organic acids of the formula RC(O)OH or acid chlorides of the general formula RC(O)Cl to form an ester. For example, if the nanofiller material were montmorillonite clay, the resulting shielded nanofiller material would have the general structure Mont-OC(O)R, wherein R is an alkyl group, aryl group, alkylaryl group, or combinations thereof.

Yet other suitable shielding reactions are reactions of polar groups with isocyanates of the general form RNCO to form the urethane. For example, if the nanofiller material were montmorillonite clay, the resulting shielded nanofiller material would have the general structure Mont-OC(O)NR, wherein R is an alkyl group, aryl group, alkylaryl group, or combinations thereof.

Further possible shielding reactions are listed in Table II.

TABLE II

| Reactant | Resulting Shielded Group |
| --- | --- |
| Alkyl, Aryl, or Alkylaryl substituted Titanides | $MontO_{(4-n)}TiOR_n$ |
| Diazomethane | Mont - $OCH_3$ |
| Chloromethyl Methyl Ether | Mont - $OCH_2OCH_3$ |
| Chloromethyl Methyl Sulfide | Mont - $OCH_2SCH_3$ |
| Dihydropyran | Mont - O-tetrahydropyran |

It is to be understood that the montmorillonite clay example, used in these examples immediately above, is for illustrative purposes, and that any of the suitable nanofiller materials described herein may be used in the reaction(s) listed above to shield the nanofiller material polar groups.

Referring again to FIG. 1, an initiator may be introduced directly into the polymeric resin, as at 22. The introduction 22 of the initiator may generally be accomplished via injection. It is to be understood that the initiator may be any suitable initiator. In an embodiment, the initiator is a free radical initiator and includes, but is not limited to peroxides and azo compounds. Further non-limitative examples of such materials are shown in Table III.

TABLE III

| Free Radical Initiators | |
| --- | --- |
| General Category | Products |
| Dialkyl Peroxides & Hydroperoxides | Dialkyl Peroxides |
| | Hydroperoxides |
| | Peracids |
| Diacyl Peroxides, Peresters, & Organic Polyoxides | Diacyl Peroxides |
| | Peroxy Esters |
| | Organometallic Peroxides |
| | Decomposition of Polyatomic - Peroxides |
| Organic Polyoxides | Dialkyl Trioxides |
| | Hydrotrioxides |
| | Tetroxides |
| Azo-Compounds | |
| Compounds with Weak C—C, N—N, C—N and N—O Bonds | Polyphenylhydrocarbons |
| | Substituted Hydrazines |
| | Alkoxyamines |
| | Nitro Compounds |
| | Nitrates and Nitrites |
| | Disulfides and Polysulfides |
| | Organometallic Compounds |

The initiator may facilitate the grafting of the compatibilized nanofiller onto the molten polymeric material (e.g. onto the polymeric material backbone) via a free radical mechanism. In an embodiment, the initiator is able to abstract a hydrogen from the polymer backbone to create a polymer radical. The polymer radical is adapted to react with the unsaturated organic group of the shielding material, thereby substantially effectively grafting the compatibilized nanofiller onto the polymer chain.

It is to be understood that the initiator may be introduced directly into the extruder 10 at any suitable position downstream D of the area wherein the polymeric material is melted and substantially mixed. In an embodiment, the initiator is introduced after completion of the reaction between the nanofiller and the unsaturated material. In an alternate embodiment, the introduction of initiator occurs downstream D of the nanofiller introduction and/or the unsaturated material introduction.

In an alternate embodiment as shown in FIG. 1, the initiator may be introduced simultaneously with at least some of the unsaturated material or an unsaturated monomer, and it should be introduced downstream D from the formation of the shielded nanofiller. It is to be understood that the temperature may be controlled so as to cause the reaction between the nanofiller material and the unsaturated material before the temperature is further adjusted for the initiation reaction. Other parameters that may be controlled include concentration of the unsaturated material, shear rate, rotation speed of the extruder 10, feed rate into the extruder 10, screw design of the extruder 10, and/or the like. It is to be understood that all or some of these parameters may be adjusted depending, at least in part, upon the particular initiator that is selected. In an alternate embodiment, the initiation reaction may occur before the reaction between the nanofiller material and the unsaturated material. For example, if the nanofiller material is introduced by itself, and the unsaturated shielding material is added with the initiator, this could be the main reaction path. Alternately, this could be a minor component of the reaction when the nanofiller material and unsaturated shielding material are introduced prior to the initiator.

Figure 3:
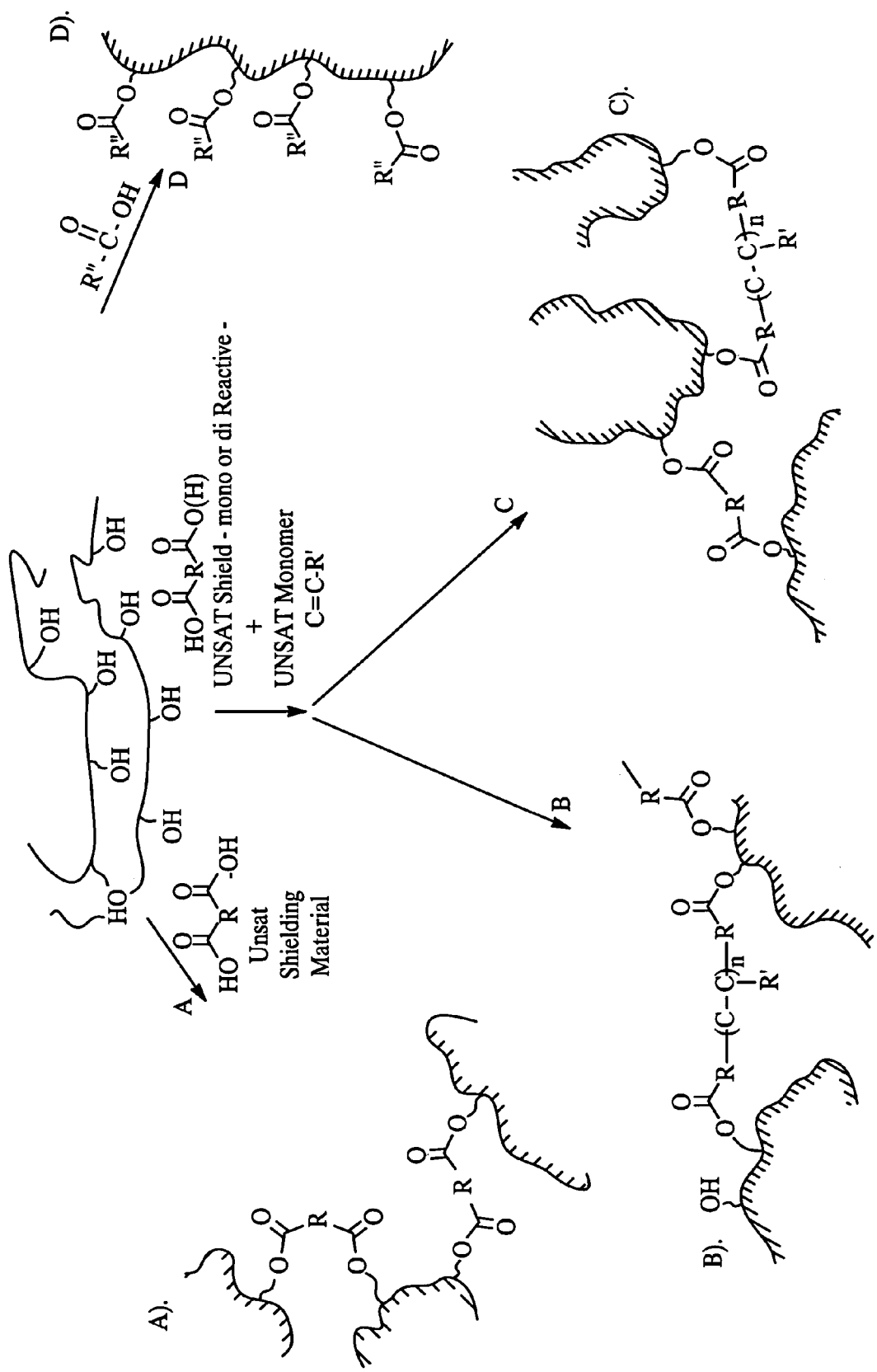
FIG. 3 is a schematic diagram illustrating various examples of nanofiller sheet exfoliation.

Depending on the reactivity ratios of the components, the results of the initiation reaction may vary. In an embodiment, the unsaturated material having two groups (non-limitative examples of which include maleic anhydride, unsaturated diacids, diacid chlorides, and the like) is capable of reacting to shield the polar groups and may join the clay sheets to form -(clay sheet, unsaturated material molecule, clay sheet, unsaturated material molecule)-$_n$. This result is shown in FIG. 3, intermediate reaction product A.

In an embodiment where the initiator is added along with some unsaturated monomer, the unsaturated monomer may polymerize with the unsaturated shielding material that is bonded to the hydroxyl groups of the clay nanofiller and propagate through the free radical initiation. This would result in many possible combinations, including, but not limited to: -(sheet, unsaturated shielding material, polymer, unsaturated shielding material, sheet, unsaturated shielding material)-$_n$ (reaction product B); and/or -sheet, unsaturated shielding material, sheet, unsaturated shielding material, polymer, unsaturated shielding material, sheet)-$_n$ (reaction product C).

It is also possible for the unsaturated shielding material to react with the hydroxyls on the clay sheet (i.e. to compatibilize (shield) the nanofiller), but for the product to not engage in the chain extension. This result is shown in FIG. 3, intermediate reaction product D.

To further illustrate embodiment(s) of the present disclosure, the following example is given. It is to be understood that this example is provided for illustrative purposes and is not to be construed as limiting the scope of embodiment(s) of the present disclosure.

EXAMPLE

Polypropylene is fed into the extruder in the most upstream barrel. The processing parameters for the extruder are set at a temperature of about 200° C., a feed rate of about 15 Kg/hour, and a screw rotation speed of about 450 rpm. The clay and the unsaturated shielding material are added downstream of an area of the extruder where the polypropylene has been substantially melted and mixed. During the processing, the reaction between the unsaturated shielding material and the polar groups on the edges of the clay sheet begins. An initiator and an unsaturated monomer are added downstream from where the clay and unsaturated shielding material are introduced. The temperature in this section of the extruder is controlled so as to cause the initiator to decompose, thereby generating free radicals. These free radicals propagate through the unsaturation on the unsaturated shielding material and the unsaturated monomer. The free radicals also abstract hydrogen from the tertiary site of the polypropylene, resulting in macroradicals that participate in the reaction with the unsaturated shielding materials.

The method according to embodiments of the present invention offers many advantages. The use of in-situ compatibilization of the nanofiller while preparing the nanocomposite materials may advantageously allow the formation process to be relatively fast and less expensive. Without being bound to any theory, it is believed that this may be due, at least in part, to the use of monomeric unsaturated shielding materials rather than polymers. Further, it is believed that the attachment of the bulky molecules of the unsaturated shielding material may assist with the exfoliation of the nanofiller/clay sheets and may help prevent undesirable nanofiller reagglomeration. This enhanced exfoliation may advantageously result in greater physical and mechanical properties of the nanocomposite material. Table IV illustrates a property of nanocomposite materials formed using the unsaturated shielding material and a comparative example without such a material.

TABLE IV

|  | 1<br>% by weight | 2<br>% by weight | 3<br>% by weight |
|---|---|---|---|
| Resin | 100 | 94.5 | 94.1 |
| Standard Clay | — | 4.7 | 4.7 |
| Unsaturated Shielding Material | — | 0.5 | 0.9 |
| Initiator | — | 0.3 | 0.3 |
|  |  |  |  |
| Total pbw | 100.0 | 100.0 | 100.0 |
| Flexural Modulus (MPa) | 818.17 | 926.77 | 956.28 |
| TEM Observations |  | No large agglomerates; Substantially long clay sheets. | Many more single clay sheets. |

As depicted in Table IV, those nancomposite materials including the unsaturated shielding material have enhanced flexural moduli over the nanocomposite material formed without the unsaturated shielding material.

While several embodiments of the disclosure have been described in detail, it will be apparent to those skilled in the art that the disclosed embodiments may be modified. Therefore, the foregoing description is to be considered exemplary rather than limiting.

The invention claimed is:

1. A method for forming a nanocomposite material, the method comprising the steps of:
   introducing a nanofiller material having polar end groups into an extruder having a polymeric material therein, the introducing being downstream of an area of the extruder wherein the polymeric material has been substantially melted and mixed;
   introducing an unsaturated shielding material into the extruder having the polymeric material therein, the introducing being downstream of an area of the extruder wherein the polymeric material has been substantially melted and mixed;
   causing the unsaturated shielding material to chemically react with at least some of the polar end groups, thereby forming a shielded nanofiller material; and
   grafting the shielded nanofiller material to the polymeric material, thereby forming the nanocomposite material;
   wherein causing the unsaturated shielding material to react and grafting the shielded nanofiller material to the polymeric material are controlled by monitoring concentration and temperature; and
   wherein the nanofiller material is substantially exfoliated and wherein the nanocomposite material exhibits enhanced physical properties.

2. The method as defined in claim 1 wherein the polymeric material comprises thermoplastic materials.

3. The method as defined in claim 2 wherein the thermoplastic materials comprise at least one of polypropylenes, polyethylenes, elastomers, impact copolymers thereof, polystyrene, polyethyleneterephthalate, polymethylmethacrylate, polycarbonate, polyurethane, poly(acrylonitrile-co-butadiene-co-styrene) (ABS), poly(acrylonitrile-co-styrene-co-acrylate) (ASA), poly(styrene-co-butadiene-co-styrene) (SBS), polycarbonate-poly(acrylonitrile-co-butadiene-co-styrene) (PC-ABS), and mixtures thereof.

4. The method as defined in claim 2 wherein the thermoplastic materials comprise one of thermoplastic olefins including at least one of polypropylene homopolymers, impact modified polypropylene, ethylene propylene elastomers, and mixtures thereof.

5. The method as defined in claim 1 wherein the nanofiller material comprises a clay material which is at least one of smectite, hectorite, montmorillonite, bentonite, beidelite, saponite, stevensite, sauconite, nontronite, illite, and mixtures thereof.

6. The method as defined in claim 1 wherein the unsaturated shielding material comprises at least one of acid chlorides having at least one free radical polymerizeable alkene functional group, carboxylic acids having at least one free radical polymerizeable alkene functional group, anhydrides having at least one free radical polymerizeable alkene functional group, and mixtures thereof.

7. The method as defined in claim 1, further comprising mixing the nanofiller material with an unsaturated monomer prior to introduction into the extruder.

8. The method as defined in claim 1 wherein grafting the shielded nanofiller material to the polymeric material is accomplished by introducing an initiator into the extruder downstream of an area of the extruder where the shielded nanofiller material is formed.

9. The method as defined in claim 8 wherein the initiator is a free radical initiator.

10. The method as defined in claim 9 wherein the free radical initiator comprises at least one of peroxides, peresters, organic polyoxides, azo compounds, and combinations thereof.

11. The method as defined in claim 8 wherein at least some of the unsaturated shielding material is introduced into the extruder with the initiator.

12. The method as defined in claim 9 wherein the unsaturated shielding material comprises maleic anhydride, and wherein grafting the shielded nanofiller material results in the reaction of excess maleic anhydride with unsaturated groups bonded to the polar groups of the nanofiller material, and propagation of maleic anhydride through free radical initiation.

13. A method for forming a nanocomposite material, the method comprising the steps of:
   introducing a nanofiller material having polar end groups and an unsaturated shielding material substantially simultaneously into an extruder having a polymeric material therein, the introducing being downstream of an area of the extruder wherein the polymeric material has been substantially melted and mixed;
   causing the unsaturated shielding material to chemically react with at least some of the polar end groups, thereby forming a shielded nanofiller material; and
   introducing an initiator into the extruder downstream of an area of the extruder where the shielded nanofiller material is formed, thereby grafting the shielded nanofiller material to the polymeric material and forming the nanocomposite material;
   wherein the nanofiller material is substantially exfoliated and wherein the nanocomposite material exhibits enhanced physical properties.

14. The method as defined in claim 13 wherein the unsaturated shielding material comprises at least one of acrylic acids, styrylic acids, maleic anhydride, acrylic acid chlorides, styrylic acid chlorides, silanes having at least one unsaturated organic group, and mixtures thereof.

15. The method as defined in claim 13 wherein at least some of the unsaturated shielding material is introduced into the extruder substantially simultaneously with the initiator.

16. The method as defined in claim 13 the initiator is a free radical initiator comprising at least one of peroxides, peresters, organic polyoxides, azo compounds, and combinations thereof.

17. A method for exfoliating a nanofiller material in a nanocomposite material, the method comprising the steps of:
   introducing a mixture of a nanofiller material having polar end groups and an unsaturated shielding material into an extruder having a polymeric material therein, the introducing being downstream of an area of the extruder wherein the polymeric material has been substantially melted and mixed;
   causing the unsaturated shielding material to chemically react with the polar end groups, wherein the nanofiller material is substantially exfoliated and a shielded nanofiller material is formed; and
   grafting the shielded nanofiller material to the polymeric material to form the nanocomposite material;

wherein the nanocomposite material exhibits enhanced physical properties.

18. The method as defined in claim 17 wherein grafting the shielded nanofiller material to the polymeric material is accomplished by introducing an initiator into the extruder downstream of an area of the extruder where the shielded nanofiller material is formed.

19. The method as defined in claim 18 wherein the nanocomposite material is adapted for use as at least one of an automotive interior body material and an automotive exterior body material.

20. A nanocomposite material formed by the method as defined in claim 1.

* * * * *